United States Patent [19]
Shin

[11] Patent Number: 5,703,668
[45] Date of Patent: Dec. 30, 1997

[54] LIQUID CRYSTAL DISPLAY DEVICE AND METHOD OF FORMING THE SAME

[75] Inventor: Woo-Sup Shin, Kumi-si, Rep. of Korea

[73] Assignee: LG Electronics Inc., Seoul, Rep. of Korea

[21] Appl. No.: 616,092

[22] Filed: Mar. 15, 1996

[30] Foreign Application Priority Data

Nov. 25, 1995 [KR] Rep. of Korea ............... 1995-43741

[51] Int. Cl.$^6$ .................................................. G02F 1/1333
[52] U.S. Cl. ........................................... 349/110; 349/122
[58] Field of Search .................. 359/67, 74; 349/110, 349/111, 122

[56] References Cited

U.S. PATENT DOCUMENTS

| | | | |
|---|---|---|---|
| 4,448,491 | 5/1984 | Okubo | 359/67 |
| 5,251,071 | 10/1993 | Kusukawa et al. | 359/68 |
| 5,495,354 | 2/1996 | Jo | 359/67 |

FOREIGN PATENT DOCUMENTS

| | | | |
|---|---|---|---|
| 556930 | 8/1993 | European Pat. Off. | 349/110 |
| 57-34522 | 2/1982 | Japan | 359/67 |

OTHER PUBLICATIONS

"Nikkei Microdevices", Jul. 1994, pp. 60–62.

*Primary Examiner*—William L. Sikes
*Assistant Examiner*—Tiep H. Nguyen

[57] ABSTRACT

A liquid crystal display device includes a substrate, a thin film transistor including a gate line, a source electrode, and a drain electrode formed on the substrate, a first protective layer formed on the thin film transistor, a black matrix pattern formed on the first protective layer, a second protective layer covering the black matrix pattern, and a pixel electrode connected to the drain electrode of the thin film transistor, wherein the first protective layer is selectively removed using the black matrix pattern as a mask to expose the pixel electrode, and wherein the second protective layer is formed using a shadow mask.

26 Claims, 6 Drawing Sheets

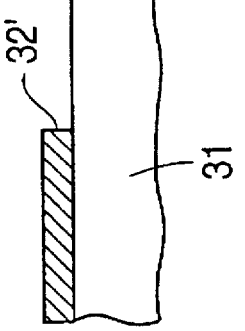
FIG. 4A-I
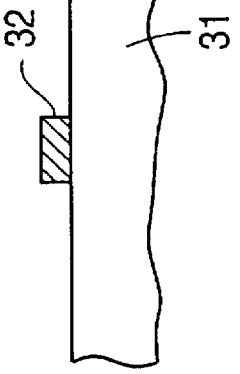
FIG. 4A-II
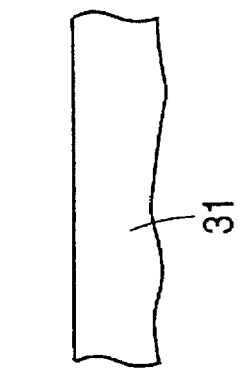
FIG. 4A-III
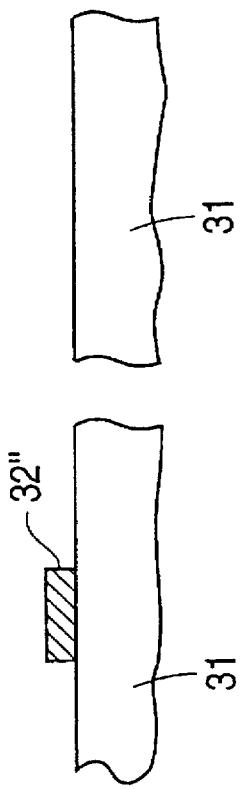
FIG. 4A-IV
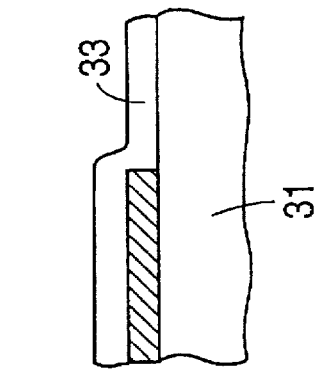
FIG. 4B-I
FIG. 4B-II
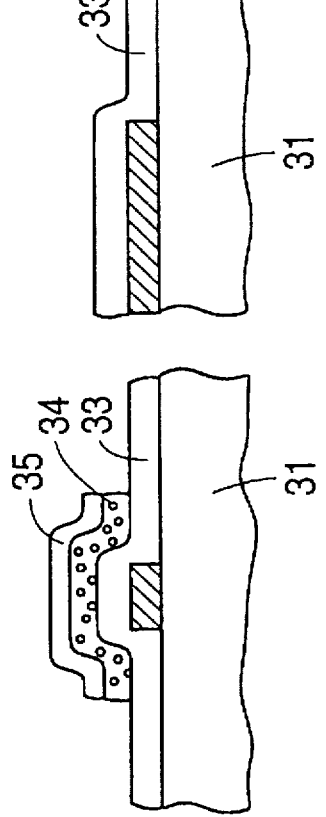
FIG. 4B-III
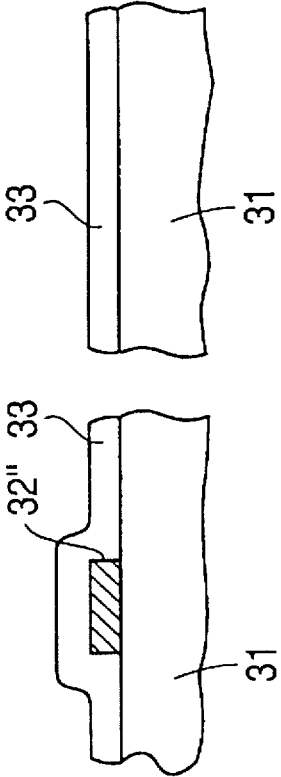
FIG. 4B-IV

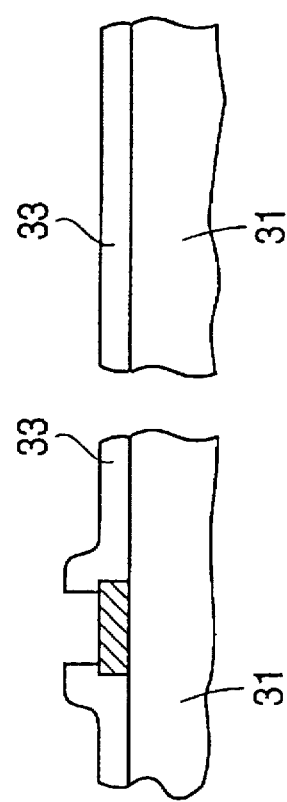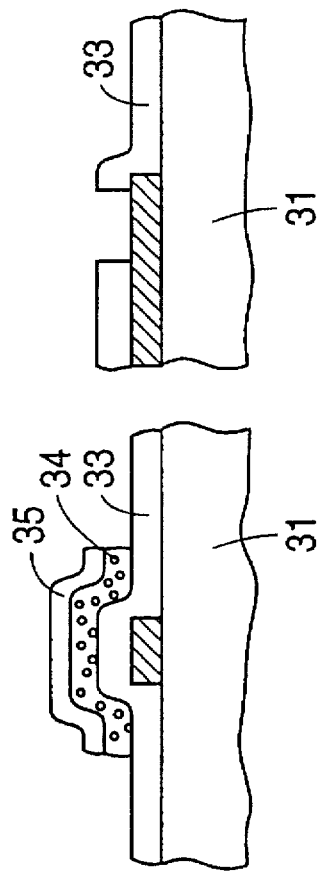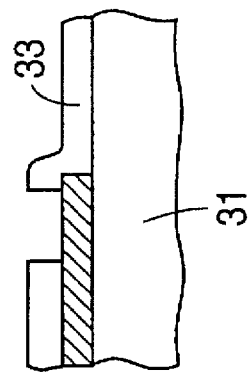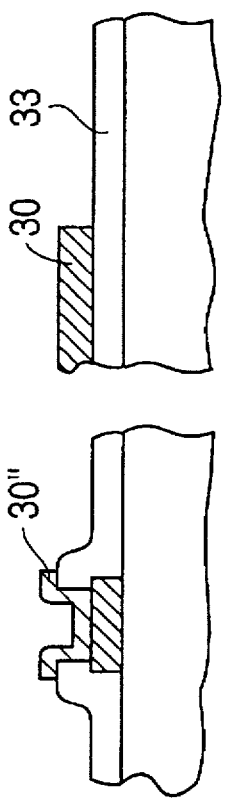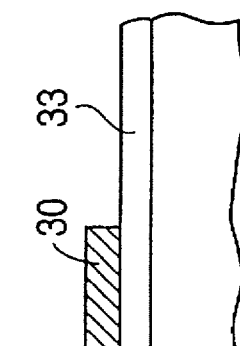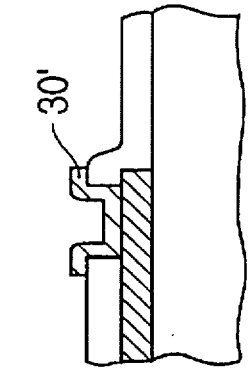

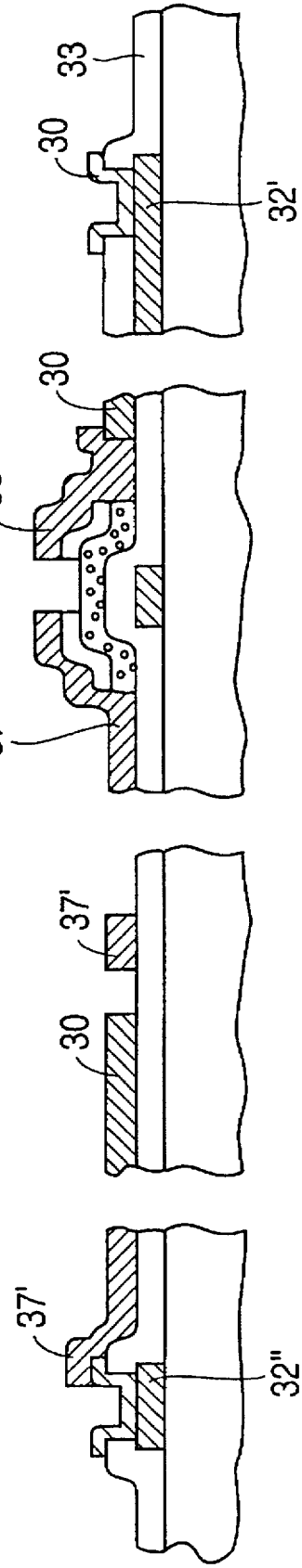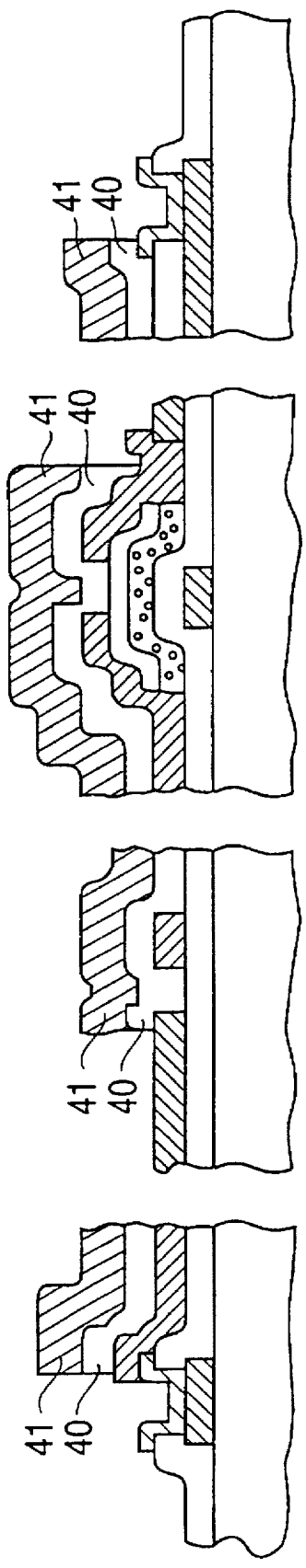

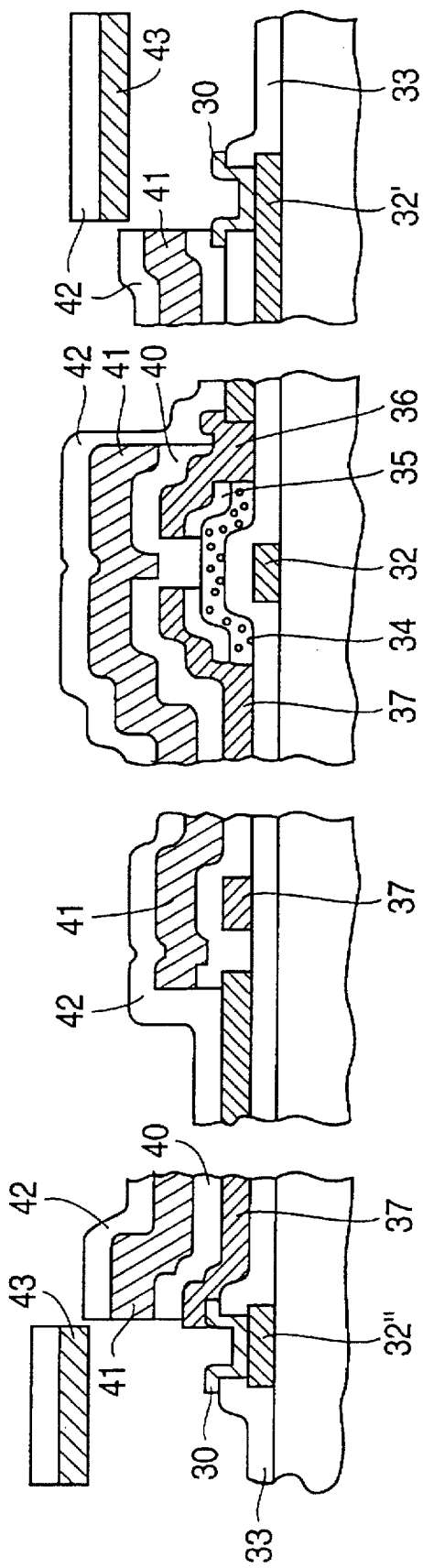

LIQUID CRYSTAL DISPLAY DEVICE AND METHOD OF FORMING THE SAME

BACKGROUND OF THE INVENTION

1. Field of the Invention

The present invention relates to a liquid crystal display (LCD) device and a method of forming the LCD device and, more particularly, to an improved thin film transistor LCD device and an improved method of forming the thin film transistor LCD device for increasing aperture ratio of the device and for obtaining low reflectivity for the device.

2. Description of Related Art

Generally, a thin film transistor liquid crystal display (TFT LCD) device includes a bottom plate having a thin film transistor (TFT) and a pixel electrode disposed thereon, a top plate having common electrodes and a color filter for displaying colors, a liquid crystal (LC) layer disposed between the top and bottom plates, and a pair of polarizers disposed on the outer surfaces of the device for selectively transmitting light.

Conventionally, a light shielding pattern or a black matrix is positioned over the color filter disposed on the top plate. Recently, however, a black matrix positioned on the bottom plate has been suggested in an article on pages 60–62, Nikkei Microdevices, published on July 1994. As shown in FIGS. 1(A) and 1(B), a conventional black matrix is located on the bottom plate and is formed with a black resin of a pigment dispersion type.

The black matrix of such conventional art is prepared by the following process. A gate electrode 6 and a gate bus line 7 are formed on a glass substrate 5. Simultaneously, a first auxiliary electrode 20 is formed, as part of the gate electrode material, around the edge of a region where a pixel electrode 18 is to be formed. Thus the first auxiliary electrode 20 can function as an auxiliary electrode and also as a metal wire for shielding light.

After a gate insulator layer 9 is formed over the glass substrate 5, a semiconductor layer is deposited and a semiconductor pattern 10 is formed by removing the portions of the semiconductor layer. Portions of the semiconductor layer corresponding to the area where the thin film transistor (TFT) is to be formed, are maintained.

Thereafter, an electrically conductive material is deposited, and a source 12, a drain electrode 12' and a data line 13 are patterned therefrom. By depositing and patterning an electrically conductive transparent layer, a pixel electrode 18 is formed between the data line 13 and gate bus line 7. When forming the source 12 and the drain electrode 12', a second auxiliary electrode 21 is disposed at a connection portion of the TFT element under the pixel electrode 18. Therefore, the second auxiliary quantity electrode 21 functions as an auxiliary electrode and also as a metal wire for shielding light.

Subsequently, a protective layer 16 is selectively formed, and a black matrix pattern 15 is formed using a black resin. This results in a three-dimensional hybrid structure, and the backlight is shielded by the first and second light shielding metal wires 20 and 21 and by the black matrix made of a black organic material.

However, such conventional black matrix structures, as shown in FIGS. 1(A) and 2(B) for example, suffer from a number of problems. For example, the LC layer can be easily contaminated by impurities flowing from the black resin; a long time is required to form such devices since additional patterning steps are needed after the photolithographic step and protective layer forming step; and residue of the black resin remains when the light shielding pattern is formed, because portions of ITO are exposed on array and pad portions.

SUMMARY OF THE INVENTION

Accordingly, it is an object of the present invention to provide an improved liquid crystal display device which eliminates the above problems encountered with the conventional liquid crystal display devices.

Another object of the present invention is to provide an improved thin film transistor device and an improved method thereof for increasing aperture ratio of the device, obtaining low reflectivity of for the device, and simplifying process steps.

A further object of the present invention is to provide a liquid crystal display device which includes a thin film transistor (TFT) containing a gate line, a source electrode and a drain electrode disposed on the bottom plate of a substrate, a first protective layer disposed on the TFT, a black matrix pattern disposed on the first protective layer for shielding light from the certain portion of the substrate, a second protective layer formed over the black matrix pattern, and a pixel electrode connected to the drain electrode of the TFT, wherein the edges of the black matrix pattern overlap portions of the pixel electrode.

Still another object of the present invention is to provide a light blocking device in a liquid crystal display device, the liquid crystal display device having a plurality of pixel electrodes, a plurality of data lines formed on a substrate, and areas not overlapping with the plurality of pixel electrodes and the plurality of data lines, a remaining region being defined as a portion of the non-overlapping areas, the light blocking device comprising: a first protective layer, covering at least the remaining region, and being equal in size to a first area; and a black matrix covering a second area on the first protective layer, wherein the first area equals the second area in size.

Yet another object of the present invention is to provide a method of forming a black matrix in a liquid crystal display device, the liquid crystal display device having a plurality of pixel electrodes, a plurality of data lines formed on a substrate, and areas not overlapping with the plurality of pixel electrodes and the plurality of data lines, a remaining region being defined as a portion of the non-overlapping areas, the method comprising the steps of: a) forming a first protective layer on at least the remaining region; b) forming a black matrix layer on the first protective layer; and c) selectively removing the black matrix layer and the first protective layer.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a liquid crystal display device including a substrate, a thin film transistor having a gate line, a source electrode and a drain electrode formed on the substrate, a first protective layer formed on the thin film transistor, a black matrix pattern formed on the first protective layer using the first protective layer as a mask, a second protective layer formed over the black matrix pattern using a shadow mask, and a pixel electrode connected to the drain electrode of the thin film transistor.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIGS. 4(A)-I to 4(G)-I are cross-sectional views of a data pad portion, taken along line 4I—4I in FIG. 2;

FIGS. 4(A)-II to 4(G)-II are cross-sectional views of FIG. 3, taken along line 4II—4II in FIG. 3;

FIGS. 4(A)-III to 4(G)-III are cross-sectional views of FIG. 3, taken along line 4III—4III in FIG. 3; and FIGS. 4(A)-IV to 4(G)-IV are cross-sectional views of a gate pad portion, taken along line 4IV—4IV in FIG. 2.

DETAILED DESCRIPTION OF THE PREFERRED EMBODIMENTS

Figure 1A:
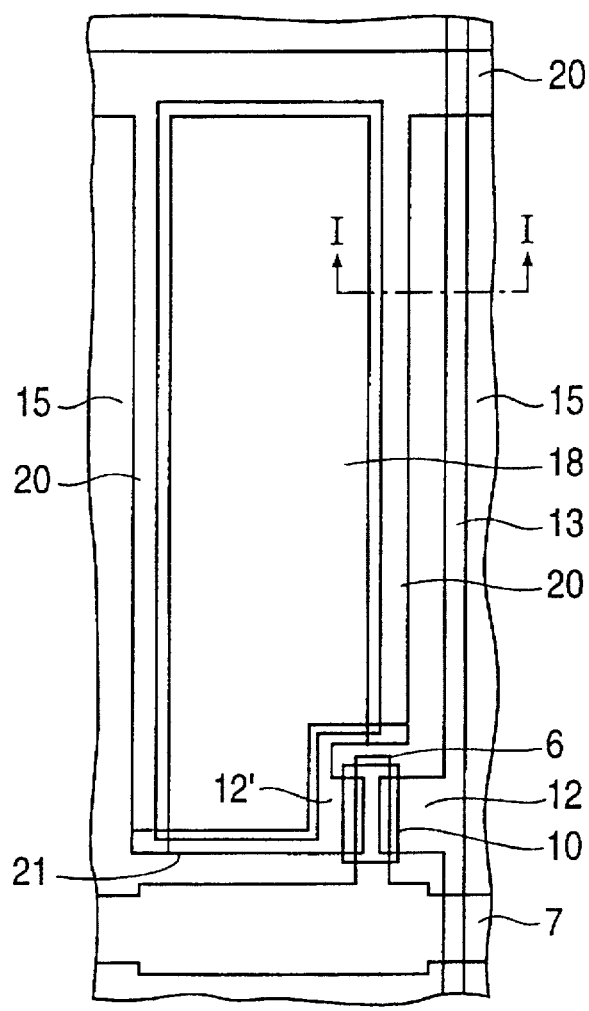
FIG. 1(A) is a layout view of a portion of a conventional LCD device having a pixel provided with a light-shielding pattern using a black resin.
Figure 1B:
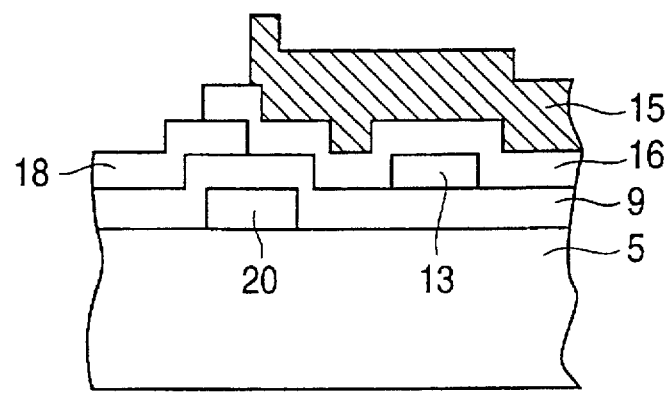
FIG. 1(B) is a cross-sectional view of FIG. 1(A), taken along line 1(B)—1(B)
Figure 2:
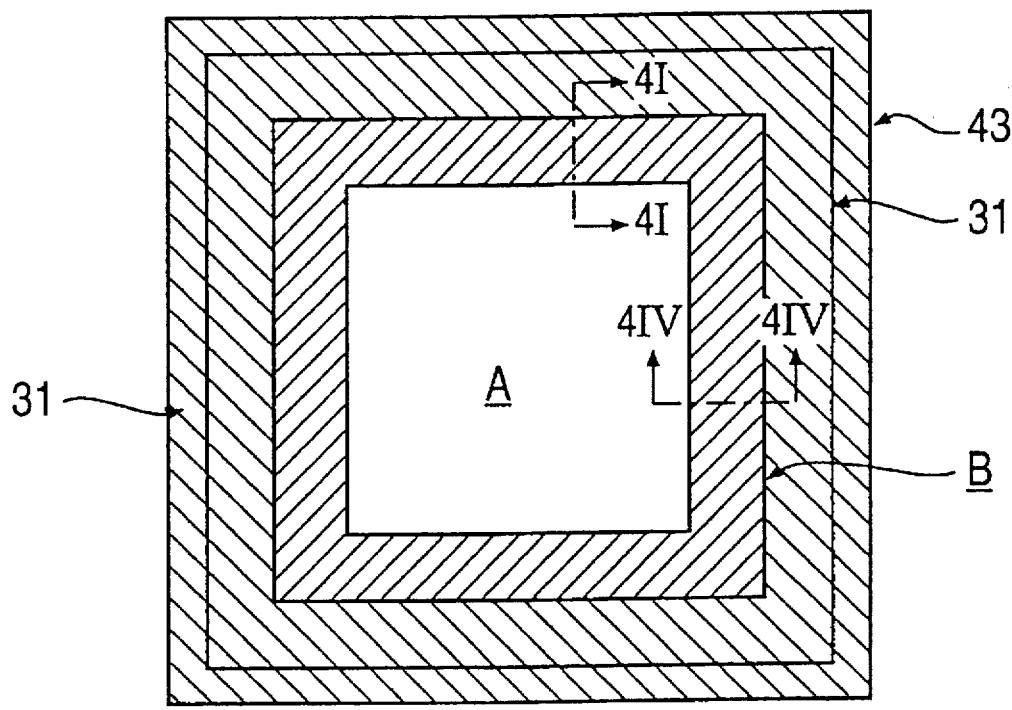
FIG. 2 is a top plan view of a substrate for illustrating a process of preparing a protective layer using a shadow mask.

Referring now in detail to the drawings for the purpose of illustrating preferred embodiments of the present invention, the liquid crystal display device as shown in FIGS. 2 to 4(G)-IV comprises a transparent substrate 31, a thin film transistor (hereinafter "TFT") having a gate electrode 32, a source electrode 37 and a drain electrode 36, a first protective layer 40 disposed on the TFT, a black matrix pattern 41, a second protective layer 42 formed on the black matrix pattern 41, and a pixel electrode 30 connected to the drain electrode 36 of the TFT.

The method according to the embodiments of the present invention comprises the steps of forming the TFT, forming the first protective layer 40, and forming the black matrix pattern 41, the second protective layer 42, and the pixel electrode 30.

As shown in FIGS. 4(A)-I to 4(G)-IV, a first metal layer is deposited on the transparent substrate 31 and patterned to form the gate electrode 32, a gate bus line 32' and a data pad 32". The first metal layer is composed of metal, such as Cr or Al, for example, and the patterning step is accomplished using photolithography.

One or two layers of a first insulator 33 composed of either silicon oxide (SiOx) or silicon nitride (SiNx), for example, are formed. Then a semiconductor layer 34 and an impurity doped semiconductor layer 35 are sequentially formed on the first insulator 33. These layers are patterned on the TFT area using photolithography. At this time, the photolithographic step selectively forms a contact hole in the data pad 32" and in the gate pad.

Figure 3:
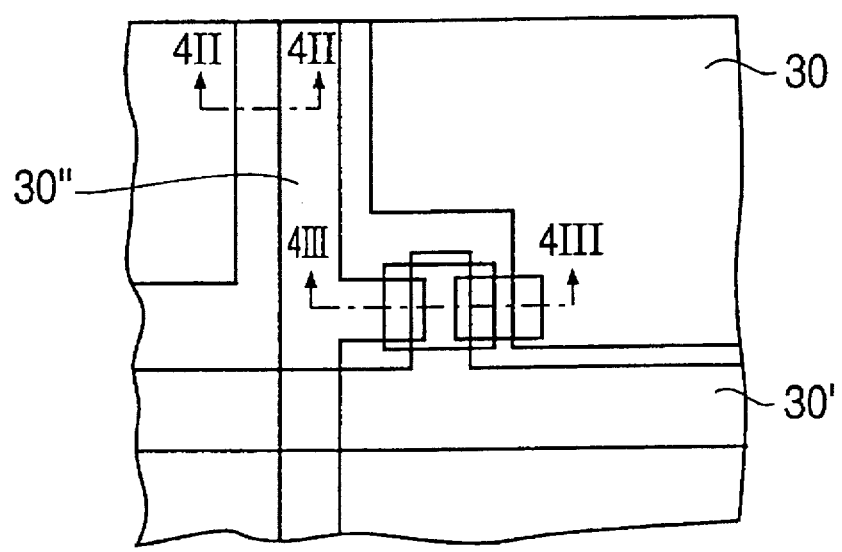
FIG. 3 is a partial top plan view of a TFT portion.

Then a transparent electrically conductive layer is formed by depositing ITO, and the pixel electrode 30 is formed using photolithography. A data pad reinforcing member 30" and a gate pad reinforcing member 30' are used to reinforce the data pad 32' and gate bus line 32' at the end portions of the data line and gate line (FIG. 3). A second metal layer is deposited thereon using a sputtering apparatus, and the drain and source electrodes 36 and 37 are formed therefrom using photolithography. The second metal layer can include Cr, Cr/Al, Cr/Al/Au, n+ a-Si:H, etc.

Using the drain and source electrodes 36 and 37 as a mask, the portion of the impurity doped semiconductor layer 35 located between the drain and source electrodes 36 and 37 at the channel portion of the TFT is removed through a dry etching process. As a result, the gate, drain and source electrodes 32, 36, 37 of the TFT including the channel portion between the source and drain electrodes are manufactured.

Subsequently, a first protective layer 40 is formed over the top surface of the TFT on at least one of data lines and pixel electrodes of the LCD device, and the black resin is coated, exposed and developed to form the black matrix pattern 41. The black matrix pattern 41 prevents transmission of light between the TFT region and data line 37' and between the data line 37' and pixel electrode 30. The black resin, being sensitive to light like a photoresist film, possesses a property that allows shielding of light after being developed. It is preferably to use a black resin which is heat resistant up to 250° C. and transmits less than 50% of the light. The thickness of about 1.5 μm for the coating of the black resin is also preferred. Using the black matrix pattern 41 as a mask, the first protective layer 40 is removed over the pixel electrode 30 and over the data/gate pad region B (FIG. 2) by a dry etching process or a wet etching process. The first protective layer 40 can be an oxide layer or a nitride layer.

The pixel forming region A formed of a plurality of pixels (FIG. 2) remains exposed and the shadow mask 43 is formed to cover the data/gate pad region B and substrate 31. Then using a shadow mask, the second protective layer 42 is deposited with silicon dioxide ($SiO_2$) or silicon nitride (SiN) using the sputtering apparatus. Conventionally, a shadow mask is only used to form a common electrode layer for a color filter on the top plate. Here, a shadow mask is advantageously used to form the second protective layer as described hereinabove. Thereafter, manufacturing steps, such as the step of forming an alignment layer ad the step of sealing the liquid crystal, are carried out to complete the process of manufacturing the TFT LCD device according to the present invention.

Therefore, the TFT plate formed according to the present invention includes the TFT having the gate line 32, the drain and source electrodes 36 and 37, the first protective layer 40 formed on the TFT and completely covering the data lines of the LCD device, the black matrix pattern 41 formed on the first protective layer 40 for shielding a certain spectrum of light, the second protective layer 42 disposed over the black matrix pattern 41, and the pixel electrode 30 connected to the drain electrode 36 of the TFT. The black matrix pattern 41 is disposed so that its edge portions overlap portions of the pixel electrode 30 for completely shielding light except for the pixel electrode region.

The LCD device according to the present invention has the following advantages. The present invention simplifies the manufacturing process because a black matrix is used, instead of the conventional photoresist, to etch the pad and protective layer of the pixel region. Furthermore, in order to prevent contamination of the liquid crystal by impurities flowing from the black resin, a shadow mask is used to form a pad portion for attaching a driver IC. As a result, additional patterning steps required in the conventional methods can be omitted.

Moreover, the present invention eliminates, when patterning the light shielding layer, the problem of having the residue of black resin remain on ITO because of the ITO exposure on the array and pad portions. In the present invention, the black resin contacts only the first protective layer 40, and not the pixel electrodes.

Additionally, by using the shadow mask 43 the second protective layer, e.g. a silicon oxide layer or a silicon nitride layer, can be formed without a separate photo-processing, and exposing of pad portions can be conveniently carried out. That is, if the photo-processing were added to pattern the second protective layer 42, the black resin may be lifted off and the pattern may be lost. The present invention avoids such problems.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A light blocking device in a liquid crystal display device, the liquid crystal display device having a plurality of pixel electrodes, a plurality of data lines formed on a substrate, and areas not overlapping with the plurality of pixel electrodes and the plurality of data lines, a remaining region being defined as a portion of the non-overlapping areas, the light blocking device comprising:

a first protective layer, covering at least the remaining region, and being of a first size; and a black matrix covering an area of a second size on the first protective layer;

wherein the first size equals the second size.

2. A light blocking device as in claim 1, wherein:

the first protective layer also at least partially covers the plurality of pixel electrodes.

3. A light blocking device as in claim 1, wherein:

the first protective layer also at least partially covers the plurality of data lines.

4. A light blocking device as in claim 3, wherein:

the first protective layer completely covers the plurality of data lines.

5. A light blocking device as in claim 1, wherein the non-overlapping areas include a plurality of thin film transistors.

6. A light blocking device as in claim 1, wherein the black matrix includes a black resin.

7. A light blocking device as in claim 6, wherein the black resin has at least one of the following qualities:

heat resistant up to about 250° C., under 50% transmission of light, and a coating thickness of about 1.5 µm.

8. A light blocking device as in claim 1, further comprising:

a second protective layer formed on the black matrix using a shadow mask.

9. A light blocking device as in claim 8, wherein at least one of the first protective layer and the second protective layer is one of a silicon oxide layer (SiOx) and a silicon nitride layer (SiNx).

10. A method of forming a black matrix in a liquid crystal display device, the liquid crystal display device having a plurality of pixel electrodes, a plurality of data lines formed on a substrate, and areas not overlapping with the plurality of pixel electrodes and the plurality of data lines, a remaining region being defined as a portion of the non-overlapping areas, the method comprising the steps of:

a) forming a first protective layer on at least the remaining region;

b) forming a black matrix layer on the first protective layer;

c) selectively removing portions of the black matrix layer and portions of the first protective layer, wherein a black matrix is formed when the portions of the black matrix layer are selectively removed; and d) forming a second protective layer on the black matrix, the step d) including the step of using a shadow mask to selectively control where the second protective layer is formed.

11. A method as in claim 10, wherein the step a) includes:

forming the first protective layer on at least one of the plurality of data lines and the plurality of electrodes.

12. A method as in claim 11, wherein:

the step c) exposes the plurality of pixel electrodes.

13. A method as in claim 10, wherein the step c) includes:

c1) selectively removing the portions of the black matrix layer to form a black matrix; and c2) selectively removing, after the step c1), the portions of the first protective layer.

14. A method as in claim 13, wherein the step c) includes:

c3) using the black matrix as a mask for the step c2).

15. A method as in claim 10, wherein the step c) includes:

c1) etching the black matrix layer and the first protective layer.

16. A method as in claim 10, wherein the non-overlapping areas include a plurality of thin film transistors.

17. A method as in claim 10, wherein:

the black matrix layer includes a black resin.

18. A method as in claim 17, wherein the black resin has at least one of the following qualities:

heat resistant up to about 250° C., under 50% transmission of light, and a coating thickness of about 1.5 µm.

19. A method as in claim 10, wherein at least one of the first protective layer and the second protective layer is one of a silicon oxide layer and a silicon nitride layer.

20. A liquid crystal display device comprising:

a plurality of data lines formed on a substrate;

a plurality of pixel electrodes formed between the plurality of data lines;

a plurality of remaining areas not overlapping with the plurality of pixel electrodes and the plurality of data lines;

a first protective layer, covering at least a portion of the plurality of remaining areas, and being of a first size;

a black matrix covering an area of a second size on the first protective layer;

wherein the first size equals the second size.

21. A device as in claim 20, further comprising:

a second protective layer formed on the black matrix using a shadow mask.

22. A device in claim 20, wherein the plurality of remaining areas include a plurality of thin film transistors.

23. A device as in claim 20, wherein:

the first protective layer also at least partially covers the plurality of pixel electrodes.

24. A device as in claim 20, wherein:

the first protective layer also at least partially covers the plurality of data lines.

25. A device as in claim 20, wherein the black matrix includes a black resin having at least one of the following qualities:

heat resistant up to about 250° C., under 50% transmission of light, and a coating thickness of about 1.5 µm.

26. A device as in claim 20, wherein at least one of the first protective layer and the second protective layer is one of a silicon oxide layer and a silicon nitride layer.

* * * * *